United States Patent Office 3,440,455
Patented Apr. 22, 1969

3,440,455
NUCLEAR REACTOR WITH THERMIONIC CONVERTERS
Kurt Stahl, Morlenbach, Reinhart Langpape, Mannheim, Germany, and Ned S. Rasor, Dayton, Ohio, assignors to Brown, Boveri & Cie, A.G., Mannheim-Kafertal, Germany, a German corporation
Filed May 11, 1967, Ser. No. 637,822
Claims priority, application Germany, May 13, 1966, B 87,104
Int. Cl. H02n 3/00
U.S. Cl. 310—4    10 Claims

ABSTRACT OF THE DISCLOSURE

This invention relates to a nuclear reactor with thermionic converters for direct conversion into electrical energy of heat produced by nuclear fission. The novel thermionic converters (4 and 5) are arranged within a reactor core (2) perpendicularly to an imaginary plane passing through the center of the core and specularly arranged relative to each other, i.e. with surfaces facing toward one another, and sealed vacuum-tightly relative to each other. The thermionic converters are provided with outlet pipes (6) for the fission gases, and coolers (7) for the thermionic converters are provided, located at the front face of the reactor core.

---

This invention relates to a nuclear reactor with thermionic converters for direct conversion into electrical energy of heat produced by nuclear fission.

There are basically two different possibilities whereby thermionic converters may be incorporated into a nuclear reactor system; namely the "in-pile" concept, where the converter is inside the reactor, and the "out-pile" concept where the converter is outside the reactor. The present invention relates to a novel in-pile arrangement.

The heretofore known in-pile arrangements have the following features in common: The fuel rods of the reactor are comprised of several electrically series-connected thermionic converters, whose emitters contain the nuclear (core) fuel. The collectors of the individual thermionic converters are electrically insulated from each other. All thermionic converters of a particular fuel rod are connected to a single cesium-storage vessel and are encircled by a common cooling system. These nuclear reactors with thermionic converters of the prior art are afflicted with the following disadvantages. The collectors of the thermionic converters must be electrically insulated, not only against one another, but also against the cooling medium, which is generally made of metal. It is difficult to effect such electrical insulation from the technical point of view. Besides, they require an undesirably high temperature difference between the collector and the cooling medium. If cesium vapor escapes through a leak occurring in one of the converters, or if, for some other reason, one of the converters becomes closed to the passage of current, all of the thermionic converters of the fuel rod are eliminated for the production of energy. It is also difficult to remove the gaseous fission-products from the core of the reactor, without electrically connecting the individual converters with each other.

It is therefore an object of the present invention to eliminate the above-described disadvantages by providing a nuclear reactor with thermionic converters capable of direct conversion of fission heat into electrical energy.

To this end, and in accordance with the present invention, thermionic converters provided with outlet pipes for the fission gases, are arranged in a reactor core perpendicular to the core's middle surface, opposite to each other, and sealed vacuum-tightly against each other. The opposite converters are mirror images of each other, as shown in FIGS. 3 and 4. Coolers for the converters are located at the one front surface of the reactor core. In order to reduce the neutron losses within the nuclear reactor, a further development of the invention provides for two reactor cores between whose free front surfaces an intermediary ring is arranged; this ring having a width which would just permit accommodation of outlet pipes for the thermionic converters, insulated from each other, as well as ducts for their electrical leads.

In order to divide the reactor into individual, electrically separated cells, a particular feature of the invention teaches that the thermionic converters, which are arranged perpendicularly in the reactor core and as mirror images of each other, should be enclosed by insulating bodies.

According to the invention, the thermionic converters, vertically and specularly arranged, i.e. with surfaces facing toward each other, may have, according to one embodiment, a common collector bottom with collector jacket surfaces attached on both sides and with a common heat exchanger for both converters, arranged at said collector jacket surfaces. The heat exchanger is connected, via a pipe line, with a cooler.

According to another embodiment, each of the vertically and specularly arranged thermionic converters has its own collector, at whose surface a heat exchanger has been arranged, the collector being connected with a cooler, via a pipe line.

The invention further provides that the cooling systems of the thermionic converters, comprising the heat exchange means, cooler and pipe line, are all electrically insulated from each other.

In accordance with a further feature of the present invention, less neutron-absorbing material is necessary at the collectors, by producing the collector jacket-surfaces, the collectors and heat exchangers, respectively, from one piece.

For a partial or complete electrical separation of the thermionic converters, arranged vertically and as mirror images of each other, the invention provides for a plate to be arranged between them, of any desired electrical resistance. This plate may be connected with the insulating body by known means, or both parts may be made in one piece.

According to a further development of the present invention, the outlet pipes of the emitter may simultaneously serve as electrical current leads for the individual thermionic converters.

In order to support and, at the same time, to insulate the emitters relative to the collectors, at a temperature considerably lower than that of the collectors, a particular feature of the invention suggests that insulating bodies be arranged between the outlet pipes of the emitters and the joints of the collectors, for the purpose of supporting and insulating the emitters.

Furthermore, pumps of known construction may be arranged in the cooling systems, containing heat exchangers, coolers, and pipe lines, or the cooling circulatory systems may be constructed and arranged as heat pipes.

Since, according to the present invention, all thermionic converters must be electrically separated from one another, it is possible, even when one or more thermionic converters are cut out of the circuit, to obtain, with the apparatus according to the invention, the highest total electrical capacity. For example, by the use of electrical accumulators, the thermionic converters may be electrically insulated from one another, or may be connected together in any desired manner, via electrical resistors.

In a preferred embodiment of the thermionic converters of the present invention, the electrical insulators, inside and outside of the nuclear reactor, may consist of beryllium-oxide; and the collectors of the thermionic converters may be made of zirconium or beryllium.

Embodiments are shown in the accompanying drawings, as typical examples, and will be described in greater detail below. In the drawings.

The same numerals are used to designate the same or functionally similar parts in each of the figures.

Figure 1:
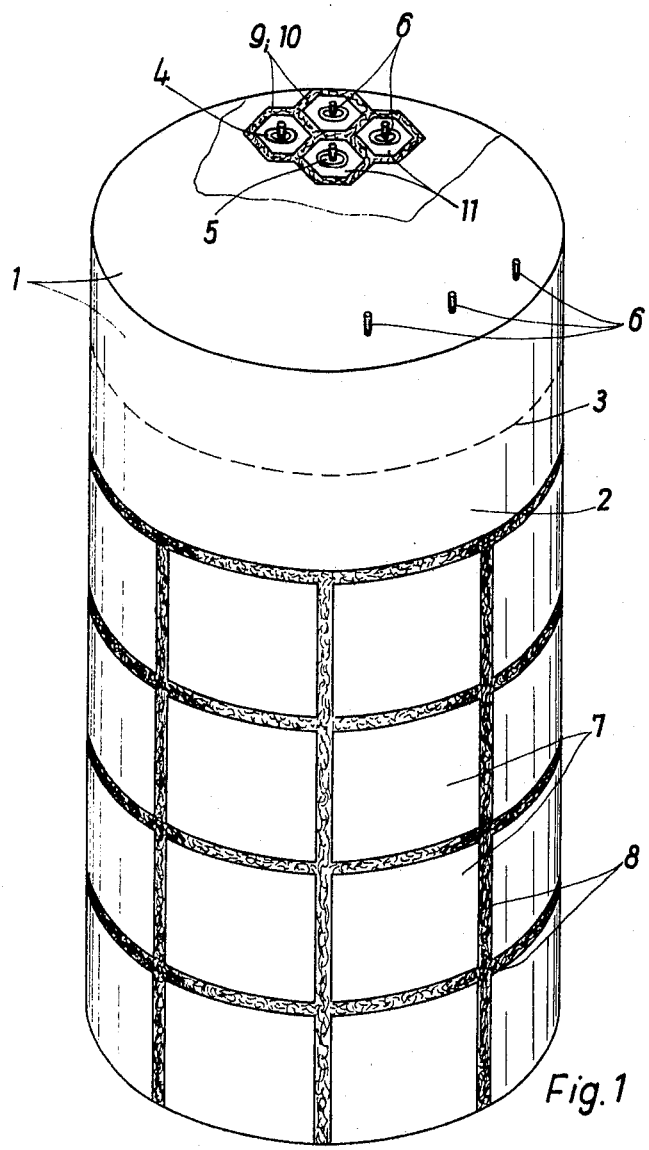
FIG. 1 is a perspective view of a nuclear reactor suitable for use in space travel, having a reactor core whose reflector lid is shown cut away to make visible a portion of the thermionic converter.
Figure 3:
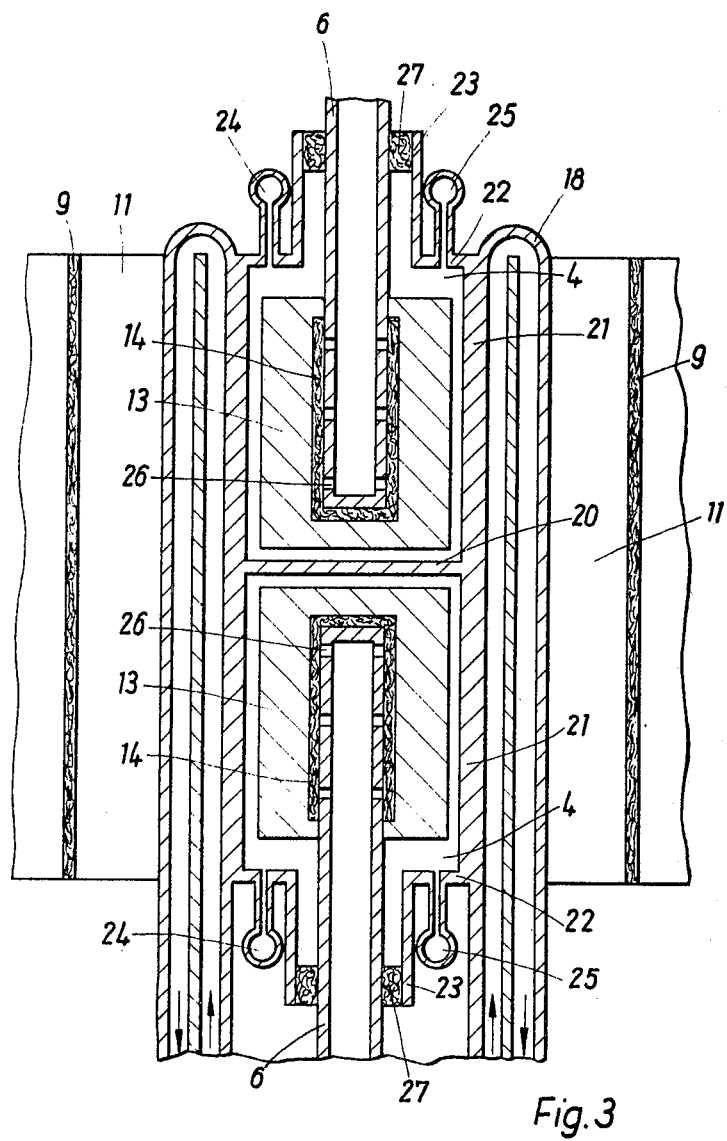
FIG. 3 shows an enlarged longitudinal cross section through a reactor core having vertically and specularly arranged thermionic converters according to one embodiment of the invention.
Figure 4:
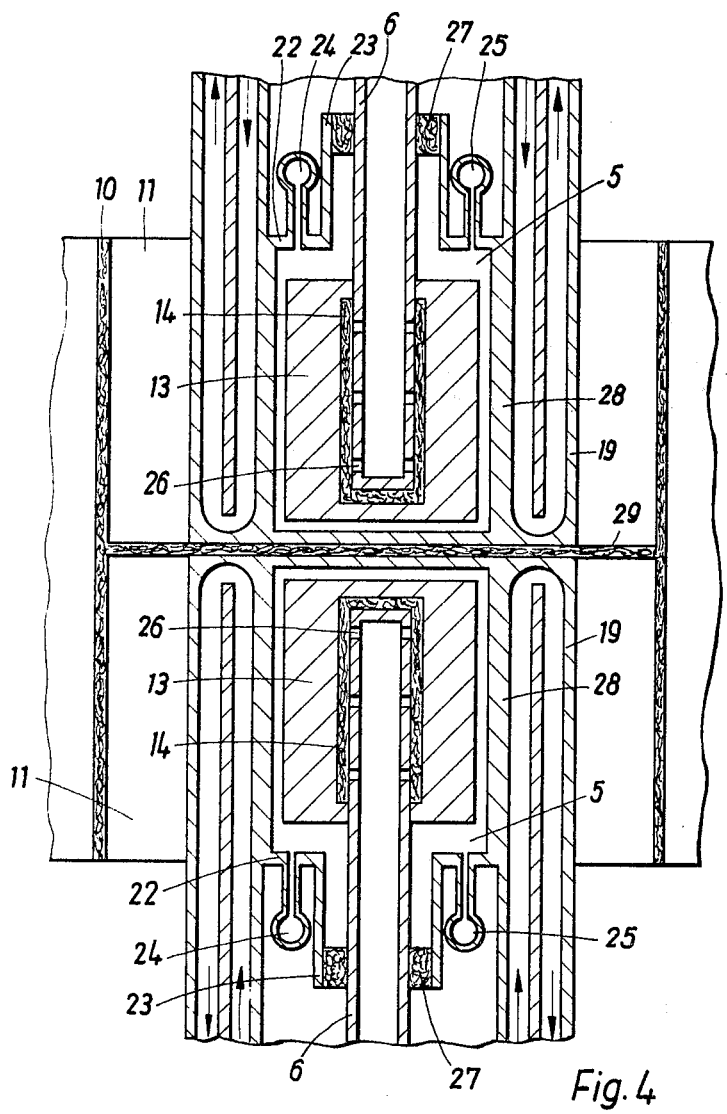
FIG. 4 is a longitudinal cross section, also enlarged, through the thermionic converters of another embodiment of the invention.

As shown in FIGS. 1, 3 and 4, the thermionic converters 4 or 5 having outlet pipes 6 (FIGS. 3 and 4) for gaseous fission products, are arranged in a reactor core 2, which is enclosed by a reflector 1. The converters 4, 5 are perpendicular relative to the reactor core's middle plane 3 and arranged oppositely, (i.e. having outer surfaces facing toward each other as mirror images) and vacuum-tightly, in relation to each other. On one front face of the reactor core 2 are coolers 7, electrically separated from each other by passages 8, arranged for cooling the thermionic converters 4 and 5. The vertically and oppositely arranged thermionic converters 4 or 5 (FIGS. 3 and 4) are enclosed by hexagonal insulating bodies 9 (FIG. 3) or 10 (FIG. 4) which simultaneously serve to subdivide the moderator 11 into individual cells.

Figure 2:
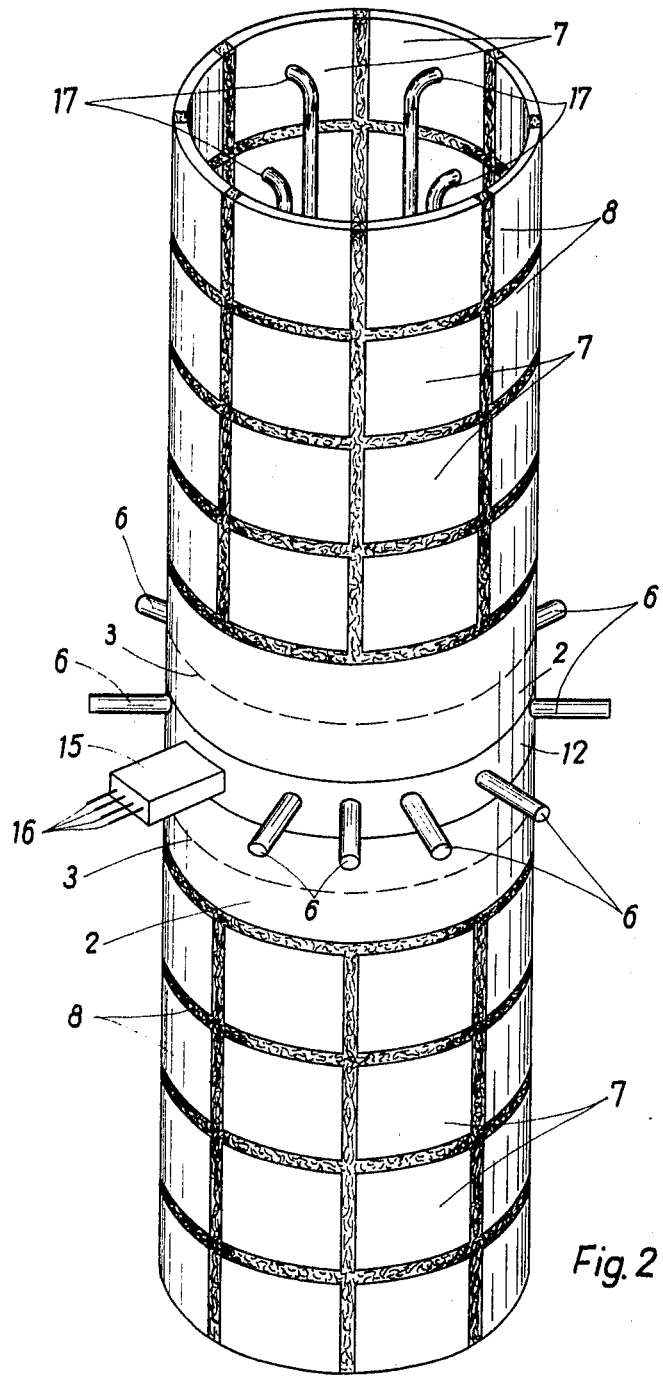
FIG. 2 is a perspective view of a nuclear reactor having two reactor cores, connected with each other by means of an intermediary ring.

In FIG. 2, the two reactor cores 2 are shown arranged with their respective front faces on the two sides of an intermediary ring 12. This ring is comprised, for example, of reflector material. These reactor cores 2 have no coolers in their front faces as in FIG. 1. From the intermediary ring 12 extend, electrically insulated from each other, outlet pipes 6 of the emitters 13 of those respective thermionic converters 4 (FIG. 3) or 5 (FIG. 4) which are adjacent to the intermediary ring 12. The outlet pipes 6 of the emitters 13 of the other oppositely arranged converters 4 (FIG. 3) or 5 (FIG. 4) which are directed toward the coolers 7, end in the hollow spaces formed by said coolers 7. The gaseous fission products, resulting from the nuclear fuels 14 contained in the emitters 13 may escape through the outlet pipes 6. The electric terminal leads 16 of the thermionic converters 4 and 5 are led out through the ducts 15. The intermediary ring is just wide enough to accommodate the duct 15 and the outlet pipes 6. The pipe lines 17 form cooling loops or circulatory systems with a respective cooler 7 and a heat exchanger 18 (FIG. 3) or 19 (FIG. 4) of the thermionic converters 4 (FIG. 3) or 5 (FIG. 4), which cooling systems are also electrically insulated against each other.

The thermionic converters 4, shown in FIG. 3, arranged vertically and oppositely relative to one another, have a common collector bottom 20, at whose both sides are attached collector jacket surfaces having end joints 23, connected via ring portions 22. The jacket surfaces 21 of the collectors and the mutual heat exchanger 18, provided for both thermionic converters 4, are produced integrally from one piece. The heat exchanger 18 is connected via a pipe line 17 with one of the coolers 7 (FIG. 2). An insulating body 9 (FIG. 3) is arranged around and spaced from the heat exchanger 18. In the space between the insulating body 9 and the heat exchanger 18 is disposed the moderator 11. Storage vessels 24, 25 for cesium and additives are arranged at the ring portions 22, for each of the thermionic converters 4. The emitter 13 holds, in the form of hollow fuel cylinders, the nuclear fuels 14, whose gaseous fission products escape from the thermionic converters 4 into outlet pipes 6 via openings 26 therein.

The emitters 13 are kept insulated against the collector jacket surfaces 21 by means of ceramic bodies 27 which are arranged between the joints 23 and the outlet pipes 6. The ceramic bodies 27 are so arranged that their temperature is only slightly higher than the highest temperature which can be reached by the storage vessels 24, 25 containing cesium and the additives.

The thermionic converters 5, illustrated in FIG. 4, differ from those designated by numeral 4 and illustrated in FIG. 3, by the fact that each of the two converters 5 has its own respective collector 28, which collectors are separated from each other by a plate 29. The latter, as well as the insulating body 10, are manufactured integrally, from one piece. A special heat exchanger 19 is provided for each of the thermionic converters 5, said heat exchanger surrounding a respective collector 28. The heat exchangers 19 are connected via separate pipe lines 17, with coolers 7 (FIG. 2) which are arranged, insulated from each other. Those portions of FIG. 4 which correspond to the same features above described relative to FIG. 3 have been given the same reference numerals and have not been described again, to avoid repetition.

Pumps of a known construction, not shown in the drawings, may be installed into the cooling loops, comprised of heat exchangers 18 or 19, coolers 7 and the pipe lines 17. It is also possible, however, to develop the cooling loops or circulatory systems as "heat pipes," namely, as surfaces radiating heat into ambient surroundings.

The arrangement of the thermionic reactor core, in accordance with the present invention, offers the following advantages. Prior to putting the nuclear reactor into operation, it is possible to test the converters by installing electrical heaters through the outlet pipes of the emitters, so that all of the thermionic converters may be tested at operational temperatures, even prior to starting the nuclear reactor. During the operation of the nuclear reactor, an accumulation of gaseous fission products in the emitters is prevented. Also, the electrical insulators, formerly needed between the collectors and the heat exchangers, which were necessary in the heretofore known arrangements of thermionic converters in nuclear reactors, are eliminated in this invention. This allows a higher temperature to be obtained for the coolant. This condition is particularly favorable in connection with the use of said nuclear reactors for space travel, where the waste heat must be dissipated through radiation. The nuclear reactors of the present invention are extremely safe during operation, since each thermionic converter is sealed vacuum tight, with respect to the other converters and, furthermore, the thermionic converters and their cooling cycles are electrically insulated from each other.

It will be obvious to those skilled in the art, upon studying this disclosure, that devices according to our invention can be modified in various respects and hence may be embodied in apparatus other than as particularly illustrated and described herein, without departing from the essential features of our invention and within the scope of the claims annexed hereto.

What is claimed is:

1. A nuclear reactor provided with thermionic converters for direct conversion of heat produced by fission into electrical energy, comprising two similar converters each having an emitter adapted to contain nuclear fuel, said converters being coaxial and disposed as mirror images of each other with the emitters of the converters in proximity to each other, and means for sealing the emitters together in vacuum tight relationship and for electrically insulating the emitters from each other.

2. A nuclear reactor according to claim 1, comprising a common collector for the two converters.

3. A nuclear reactor according to claim 2, comprising an outlet pipe for gaseous fission products in each converter, each said outlet pipe extending into the nuclear fuel in its respective converter, each outlet pipe having radial discharge openings through the wall thereof for receiving and transporting such gaseous fission products.

4. A nuclear reactor according to claim 3, comprising a ceramic body disposed between the escape pipe and the collector and forming a gas tight seal therebetween.

5. A nuclear reactor according to claim 2, wherein the collector is made in the form of a radially flattened tube, and comprising a generally central annular divider disposed within the tube, and means to introduce coolant into the tube on one side of the divider and to exhaust coolant from the tube on the other side of the divider.

6. A nuclear reactor according to claim 5, wherein the reactor has a housing and surface coolers on the housing electrically insulated from each other, and comprising conduit means connecting the collector to at least one of said surface coolers.

7. A nuclear reactor according to claim 6, wherein said conduit means is a heat transfer circulating loop, said conduit means having portions thereof provided with radiant outer surfaces for radiating heat into ambient surroundings.

8. A nuclear reactor according to claim 5, wherein the electrical insulation both inside and outside the converters is comprised of beryllium oxide.

9. A nuclear reactor according to claim 2, wherein the collector is comprised of zirconium.

10. A nuclear reactor according to claim 2, wherein the collector is comprised of beryllium.

References Cited

UNITED STATES PATENTS

| 3,093,567 | 6/1963 | Jablonski et al. | 310—4 |
| 3,259,766 | 7/1966 | Beckjord et al. | 310—4 |
| 3,302,042 | 1/1967 | Grover et al. | 176—39 |
| 3,321,646 | 5/1967 | Grover et al. | 176—39 |

FOREIGN PATENTS

| 1,394,782 | 3/1965 | France. |

OTHER REFERENCES

Howard, R. C.: Nuclear Science and Engineering 10, 173–182 (1961), pp. 173–180.

REUBEN EPSTEIN, *Primary Examiner.*

U.S. Cl. X.R.

176—39